United States Patent Office 2,953,433
Patented Sept. 20, 1960

2,953,433

PURIFICATION OF ZIRCONIUM TETRAHALIDE

Ivan Edgar Newnham, North Balwyn, Victoria, Australia, assignor, by mesne assignments, to Mallory-Sharon Metals Corporation, a corporation of Delaware No Drawing. Filed Feb. 12, 1957, Ser. No. 639,626

5 Claims. (Cl. 23—87)

This invention relates to a method of purifying zirconium tetrahalide. More particularly, the invention pertains to the removal of undesirable metal contaminants from zirconium tetrahalide by direct chemical means as distinct from physicochemical methods such as fractional distillation, fractional precipitation, fractional crystallization and ion exchange processes.

This application is a continuation-in-part of Serial No. 548,547, filed November 22, 1955, now Patent No. 2,855,281.

In the usual method of preparing zirconium tetrahalide, a zirconium-containing material or ore such as baddeleyite, zircon sand etc. is subjected to halogenation at temperatures of about 450° to 650° C. In addition to the formation of zirconium tetrahalide metals such as hafnium, iron, aluminum, silicon, titanium, vanadium, etc., which are often associated with the zirconium-containing materials, are obtained as by-products in the form of their halides. For example, in the chlorination of a zirconium-containing ore such as zircon, zirconium tetrachloride is obtained in admixture with ferric chloride, aluminum chloride, titanium chloride and other metal chlorides. The separation of the contaminating metal chlorides from the zirconium tetrachloride is difficult and can not be achieved by the conventional physical separation methods. The prior art proposal of hydrogenating the mixed metal chlorides to selectively reduce the metal chloride impurities with subsequent separation from unreduced zirconium tetrachloride fails to result in a high order of purification. The method of purifying the crude zirconium tetrachloride by passage over metallic reducing agents such as zinc has the disadvantage of obtaining by-product zinc chloride along with the zirconium tetrachloride. It is one object of this invention to overcome the difficulties of the prior art processes for purifying zirconium tetrahalides. Another object of this invention is to remove the metallic impurities from the zirconium tetrahalides by direct chemical means. Other objects of the invention will be obvious from the ensuing description.

In accordance with the present invention, it has now been found that the metallic impurities such as iron, silicon, titanium, aluminum etc. in the form of their halides can be effectively separated from the zirconium tetrahalide by treatment with zirconium dihalide. The basis of this invention is the discovery of the marked differences in the chemical reducibility of certain metal halide impurities and zirconium tetrahalide. More specifically, it has been found that the zirconium dihalide, which normally will be produced in the first instance by treatment of the zirconium tetrahalide feed with finely divided metallic zirconium, selectively reduces the zirconium tetrahalide to one or more lower valence halides or to metallic zirconium. On the other hand, metallic halide impurities such as hafnium tetrahalide and aluminum trihalide remain unchanged and are readily separated from the reduced zirconium tetrahalide. The iron trihalide and vanadium trihalide impurities are also reduced by the zirconium dihalide, but are subsequently removed from the reduced zirconium tetrahalide as hereinafter described. If titanium tetrahalide is present as one of the impurities, a portion will remain unreduced and recovered along with the hafnium tetrahalide and aluminum trihalide, while some of the titanium tetrahalide will be reduced by the zirconium dihalide and will be recovered with the iron and vanadium. With respect to silicon halide impurities the silicon tetrahalide is reduced to disilicon hexahalide which can be removed as a gas by means of an argon purge prior to the disproportionation step.

The use of zirconium dihalide as the reducing agent has the advantage of being repeatedly usable in the process, as hereinafter set forth, for the treatment of successive batches of impure zirconium tetrahalide. In addition, the purified zirconium tetrahalide obtained in accordance with the method of this invention, is free of contaminant metal halides produced when zinc or similar metals are employed as the reducing agent.

In general, the purification of zirconium tetrahalide is carried out by heating the impure feed material in an inert atmosphere (argon or other inert gas) or in vacuo with zirconium dihalide. As noted above, the zirconium tetrahalide is preferentially reduced to the trihalide, dihalide or to zirconium metal while certain of the metal halide impurities remain unreduced. The reduction need not be carried out until all of the zirconium tetrahalide is reacted, although it is desirable to avoid the loss of as much zirconium tetrahalide as possible. The most suitable temperature range for carrying out the selective reduction will depend in part upon the halide employed. In the reduction of zirconium tetrahalide the temperature will be maintained within the range of about 300° to 450° C. preferably about 350° to 400° C. although temperatures as high as 500° C. may be effectively employed. The separation of the unreduced metal halide impurities from the reduced zirconium tetrahalide may be readily accomplished. The unreduced metal halide impurities may, for example, be removed under vacuum from the reduced zirconium tetrahalide. It is also possible to separate the metal halide impurities and any unreduced zirconium tetrahalide by sublimation from the reduced zirconium tetrahalide and reduced metal chloride impurities. Other known methods of separation may be employed without departing from the scope of the instant invention.

The preferred purification process of the invention comprises reacting the impure zirconium tetrachloride feed with zirconium dichloride under such operating conditions that the zirconium tetrachloride is primarily reduced to zirconium trichloride. The unreduced metal chloride impurities are then separated with the unreacted zirconium tetrachloride, by means set forth above. The residue comprising zirconium trichloride and reduced metal chloride impurities is then heated to a temperature within the range of about 330° to 550° C. in an inert atmosphere to effect preferential disproportionation of the zirconium trichloride according to the left-to-right direction of the following reversible reaction:

$$2ZrCl_3 \rightleftarrows ZrCl_2 + ZrCl_4$$

The gaseous zirconium tetrachloride obtained by the disproportionation may then be separated by conventional means from the relatively involatile zirconium dichloride and reduced metal chloride impurities. It is possible, for example, to condense the gaseous zirconium tetrachloride on a cooled coil or metal surface. The substantially pure zirconium tetrachloride so-recovered may then be employed in the preparation of zirconium sponge in accordance with known methods. The residue of involatile zirconium dichloride, which remains behind in the reaction vessel may be further employed effectively by treatment of successive batches of impure zirconium tetrachloride feed. It will be apparent that the process of the invention readily permits semi-continuous operation including periodic insertion of fresh batches of the impure zirconium tetrachloride into the reaction vessel with careful temperature control as outlined above.

Instead of disproportionating the zirconium trichloride, the reduced subhalides of zirconium obtained by the selective reduction reaction may be recovered from the reaction vessel by being dissolved in water or dilute mineral acid such as hydrochloric acid, nitric acid, sulfuric acid, etc. to obtain solutions of zirconium oxyhalides. Other methods of recovery of the zirconium subchlorides may also be employed.

One method of operating the inventive process would be to react impure zirconium tetrachloride containing small amounts of metal chloride impurities in vapor or liquid state with zirconium dichloride to reduce only a portion of zirconium tetrachloride. The unreduced zirconium tetrachloride containing a relatively higher percentage of the unreduced metal chloride impurities may then be recycled continuously through the system for further treatment. Complete reduction of the zirconium tetrachloride to dichloride is also within the scope of the instant invention. Furthermore, it is contemplated that the process of the invention may be so operated that both the reduced and unreduced metal chloride impurities may be recovered substantially free of zirconium metal or chlorides thereof.

The invention will be more fully understood by reference to the following illustrative examples.

EXAMPLE I

Crude zirconium carbide is first formed by heating zircon sand in a graphite resistor furnace or an arc furnace in the known manner. Following prior art teachings, the crude zirconium carbide is then converted to the crude zirconium tetrachloride by heating in a stream of chlorine. The chlorides of zirconium and the metal impurities are next collected on the cooled coils of a removable lid or on some other condenser member of the reaction vessel. The lid or other condenser member carrying the various metal chlorides is then transferred to another reaction vessel containing powdered zirconium. The vessel is evacuated and heated to 430° C. at which temperature the zirconium tetrachloride sublimes and reacts in the bottom of the vessel with the powdered zirconium metal to form the relatively involatile trichloride. At the same time as the zirconium tetrachloride is reduced, the ferric chloride will also be reduced to relatively involatile ferrous chloride, which will collect in the bottom of the chamber together with the zirconium trichloride and any remaining zirconium metal. The vessel is then cooled to condense any unreduced metal chlorides on the condenser coils of the removable lid or the like. In this case, the chlorides of aluminum and hafnium are not reduced and will condense on the coils, and thus may be separated from the zirconium. Much of the titanium chloride also condenses on the coils, while the remainder is reduced to relatively involatile titanium dichloride by the powdered zirconium metal in the bottom of the vessel.

The silicon tetrachloride is reduced to gaseous disilicon hexachloride which is removed by an argon purge. The lid or other condenser member on which the unreduced chlorides of hafnium, aluminum and titanium have collected is then replaced by a new condenser member and once again the vessel is evacuated and heated to 540° C. During this second heating stage, the zirconium trichloride disproportionates in accordance with the formula:

$$2ZrCl_3 \rightarrow ZrCl_4 + ZrCl_2$$

The pure zirconium tetrachloride will be condensed on the coils of the condenser which are kept cool during the heating of the vessel in this stage of the process. The residue in the vessel consists of the reduced chlorides of titanium and iron together with a mixture of zirconium and zirconium dichloride, and is used as the reducing agent for the next batch of impure zirconium tetrachloride in place of the powdered zirconium referred to above as the reducing agent used at the commencement of the process.

*Table A*

| Metal Contaminants | Feed ZrCl₄, p.p.m. | ZrCl₄ Product, p.p.m. |
|---|---|---|
| Hafnium | 2% | <100 |
| Iron | 1000 | 20 |
| Silicon | 500 | <150 |
| Titanium | 1000 | <250 |
| Aluminum | 100 | <50 |
| Vanadium | | |

The above data show that impure zirconium tetrachloride may be substantially freed of other metal chloride impurities by reaction with zirconium dichloride under the conditions outlined above. It should also be noted that the inventive process avoids the difficulties of the prior art and constitutes a direct and relatively inexpensive method of purification.

The instant invention may also be employed to prepare "crystal-bar" zirconium from a crude source of zirconium. At the present time ductile "crystal-bar" zirconium is prepared from "sponge" zirconium by a process involving the formation and subsequent decomposition of zirconium iodide. In the known process for forming zirconium sponge, zircon sand is heated with carbon to produce a carbide, which is chlorinated to produce zirconium tetrachloride, and the latter is reduced by a suitable reducing agent such as magnesium. Zircon sand normally contains impurities such as hafnium, aluminum, iron and vanadium, and, therefore, it is necessary to provide additional steps in the process to remove these impurities. The normal procedure for producing pure "crystal-bar" zirconium is thus of an involved nature and especially so when additional steps are required to eliminate hafnium and other metal impurities. This feature of the invention is illustrated in the following example.

EXAMPLE II

Crude zirconium carbide is first formed by heating zircon sand with carbon in a graphite resistor furnace or an arc furnace in the known manner. Following prior art teachings, the crude zirconium carbide is then converted to the crude zirconium tetraiodide by heating in a stream of iodine. The iodides of zirconium and the metal impurities are next collected on the cooled coils of a removable lid or on some other condenser member of the reaction vessel. The lid or other condenser member carrying the various metal iodides is then transferred to another reaction vessel containing powdered zirconium. The vessel is evacuated and heated to 500° C. at which temperature the zirconium tetraiodide sublimes and reacts in the bottom of the vessel with the powdered zirconium metal to form the relatively involatile triiodide. At the same time as the zirconium tetraiodide is reduced, the iodides of iron and vanadium will also be reduced to relatively involatile lower iodide form, which will collect in the bottom of the chamber together with the zirconium triiodide and any remaining zirconium metal. The vessel is then cooled to condense any unreduced metal iodides on the condenser coils of the removable lid or the like. In this case, the iodides of aluminum and hafnium are not reduced and will condense on the coils, and thus may be separated from the zirconium. From 50 to 70% of the titanium iodide also condenses on the coils, while the remainder is reduced to relatively involatile titanium diiodide by the powdered zirconium metal in the bottom of the vessel.

The lid or other condenser member on which the unreduced iodides of hafnium, aluminum and titanium have collected is then replaced by a new condenser member and once again the vessel is evacuated and heated to 350° C. During this second heating stage, the zirconium triiodide disproportionates in accordance with the formula:

$$2ZrI_3 \rightarrow ZrI_4 + ZrI_2$$

and pure zirconium tetraiodide will be condensed on the coils of the condenser which are kept cool during the heating of the vessel in this stage of the process. The residue in the vessel consists of the reduced iodides of titanium, iron and vanadium together with a mixture of zirconium and zirconium diiodide, and is used as the reducing agent for the next batch of impure zirconium tetraiodides in place of the powdered zirconium referred to above as the reducing agent used at the commencement of the process.

The lid or other condenser on which the pure zirconium tetraiodide has been collected is then removed from the vessel and the iodide obtained therefrom is passed over a heated zirconium wire in known manner in order to decompose the iodide and form "crystal-bar" zirconium.

Table B

| Metal Contaminants | Feed ZrI₄, p.p.m. | ZrI₄ Product, p.p.m. |
| --- | --- | --- |
| Iron | 1500 | 25 |
| Silicon | 450 | <150 |
| Titanium | 1200 | <250 |
| Aluminum | 200 | <50 |

The process in accordance with the invention thus enables hafnium-free "crystal-bar" zirconium to be produced from a crude zirconium source by the direct conversion of carbide to iodide and thereby eliminates several steps from the known procedure. The reduction step in the process in which the higher iodides are reduced to lower iodides enables hafnium, aluminum and other metals to be separated from the reduced metal iodides. The subsequent heating step in the process in which the reduced iodide of zirconium disproportionates, enables other impurities such as iron and vanadium, the iodides of which are reduced when the reduction of zirconium tetraiodide to zirconium triiodide takes place, to be separated from the recovered zirconium tetraiodide. Titanium, and other metals which form lower iodides with disproportionation temperatures close to that of zirconium triiodide, can be partly removed on the coils as volatile iodides and partly collected at the bottom of the vessel as comparatively involatile lower iodides. It is possible to retain any reduced titanium iodide in the involatile residue by making use of the fact that, although zirconium triiodide is disproportionated at temperatures above 310° C., titanium triiodide does not commence to disproportionate until the temperature exceeds 350° C.

Though purification in accordance with the present invention has been described primarily with zirconium tetrachloride and zirconium tetraiodide, it will be understood that other halides such as bromide may also be employed. In general, the disproportionation of the zirconium dihalides will be carried out at a temperature within the range of about 300° to 600° C., preferably about 330° to 550° C. It will be further understood that the operating conditions set forth in the above examples may be varied within the limits indicated in the more general description of the invention.

By the terms "sublimation" and "sublime" it is intended to mean the conversion of a substance from the solid state to the gaseous state and back into the solid state without it appearing at any time in the liquid state, the direct conversion of solid to vapor, or the direct conversion of vapor to solid. This definition is taken from the Condensed Chemical Dictionary, Fourth Edition, published by the Reinhold Publishing Corporation in 1950.

What is claimed is:

1. A process for the separation of zirconium tetrahalide from metal halide impurities, said metal being selected from the group consisting of iron, aluminum, silicon, vanadium, and mixtures thereof, which comprises reducing the zirconium tetrahalide to zirconium trihalide with zirconium dihalide at a temperature of about 300° to 450° C., separating unreduced metal halide impurities from the zirconium trihalide and from metal halide impurities which are reduced to lower halide forms by reaction with zirconium dihalide, heating said zirconium trihalide and said reduced metal impurities at a temperature within the range of about 300° to 600° C. to selectively disproportionate the zirconium trihalide, and then separating the resulting zirconium tetrahalide from the zirconium dichloride and reduced metal halide impurities, wherein said zirconium and metal halides are selected from the group consisting of chlorides, iodides and bromides.

2. The process of claim 1 wherein said unreduced metal halide impurities are removed by sublimation.

3. The process of claim 1 wherein said zirconium dihalide resulting from said disproportionation is used to reduce a subsequent batch of zirconium tetrahalide to the trihalide form.

4. A process for the purification of impure zirconium tetrahalide containing aluminum, titanium, iron, and vanadium halide impurities which comprises heating said impure zirconium tetrahalide at a temperature within the range of about 300° to 450° C. in the presence of zirconium dihalide to convert the zirconium tetrahalide to zirconium trihalide and reduce the iron, vanadium and a portion of the titanium halides to relatively non-volatile lower halide forms, separating any unreduced halides of zirconium, aluminum, titanium from said reduced halides, heating the reduced halides to a temperature within the range of from about 300° to 600° C. to selectively disproportionate the zirconium trihalide to obtain zirconium tetrahalide, and separating said zirconium tetrahalide from a residue comprising zirconium dihalide and the reduced halides of iron, vanadium, and titanium, wherein said zirconium and metal halides are selected from the group consisting of chlorides, iodides and bromides.

5. The process of claim 4 wherein said residue is used to reduce a subsequent batch of impure zirconium tetrahalide.

References Cited in the file of this patent

UNITED STATES PATENTS

| | | |
| --- | --- | --- |
| 2,670,270 | Jordan | Feb. 23, 1954 |
| 2,682,445 | Frey | June 29, 1954 |
| 2,785,973 | Gross et al. | Mar. 19, 1957 |
| 2,791,485 | Newnham | May 7, 1957 |

OTHER REFERENCES

Mellor: "A Comprehensive Treatise on Inorganic and Theoretical Chemistry," vol. 7, p. 143 (1927), Longmans, Green and Co., New York, N.Y.

Barksdale: "Titanium," pp. 80–83, 85, 86, The Ronald Press Co., New York, N.Y., 1949.